United States Patent [19]

Taniguchi et al.

[11] Patent Number: 4,682,884
[45] Date of Patent: Jul. 28, 1987

[54] MECHANISM FOR ADJUSTING THE STARTING POSITION OF SLIDING TABLE OF AN ELECTROPHOTOGRAPHIC COPYING MACHINE

[75] Inventors: Akihiko Taniguchi; Takahiro Fukunaga, both of Nara; Eiichi Shimizu, Yamatokoriyama, all of Japan

[73] Assignee: Sharp Kabushiki Kaisha, Osaka, Japan

[21] Appl. No.: 806,491

[22] Filed: Dec. 9, 1985

[30] Foreign Application Priority Data

Jan. 8, 1985 [JP] Japan ............................. 60-1325[u]

[51] Int. Cl.⁴ ...................... G03B 27/48; G03B 27/50; G03B 27/70
[52] U.S. Cl. ............................................ 355/51; 355/8; 355/11
[58] Field of Search .......................... 355/8, 11, 51, 57

[56] References Cited

U.S. PATENT DOCUMENTS 3,598,489 8/1971 Thomas et al. ...................... 355/51
3,950,090 4/1976 Washio et al. ...................... 355/51 X Primary Examiner—Richard A. Wintercorn
Attorney, Agent, or Firm—Flehr, Hohbach, Test, Albritton & Herbert

[57] ABSTRACT

This invention relates to an electrophotographic copying machine of a type having a table which moves along a given direction and a source unit of a unitized structure which includes a lamp and a mirror for initially reflecting the reflected light from a document to be copied such that the position of the source unit can be adjusted at the time of its assembly. The copying machine according to the present invention includes a detector for detecting the starting position of the slidably movable table and this detector is attached to a plate of which the position is adjustable along the direction of motion of the table independently of the source unit whereby the problems associated with fluctuations in the start-up distance traveled by the table before acquiring a steady speed can be eliminated.

4 Claims, 6 Drawing Figures

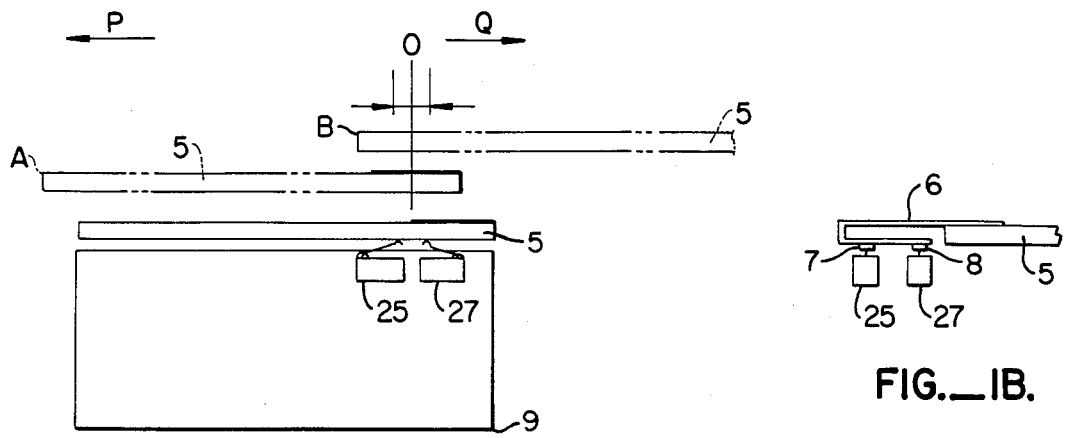
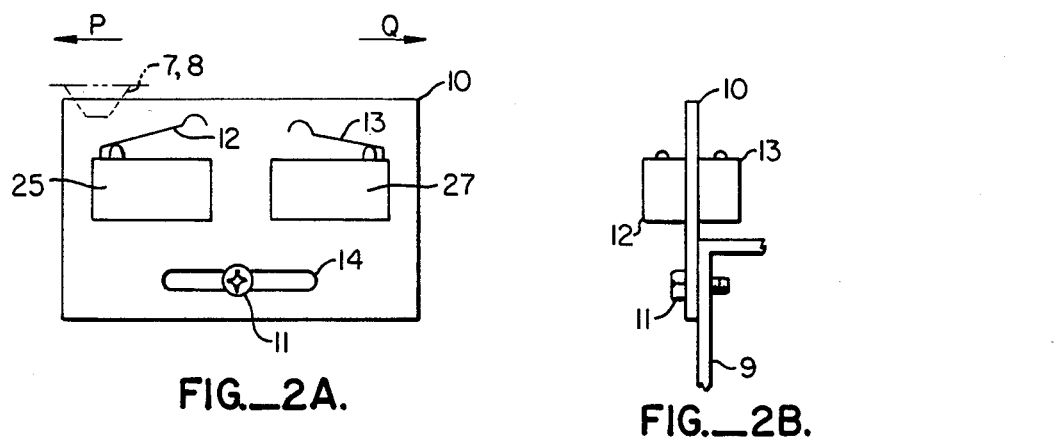
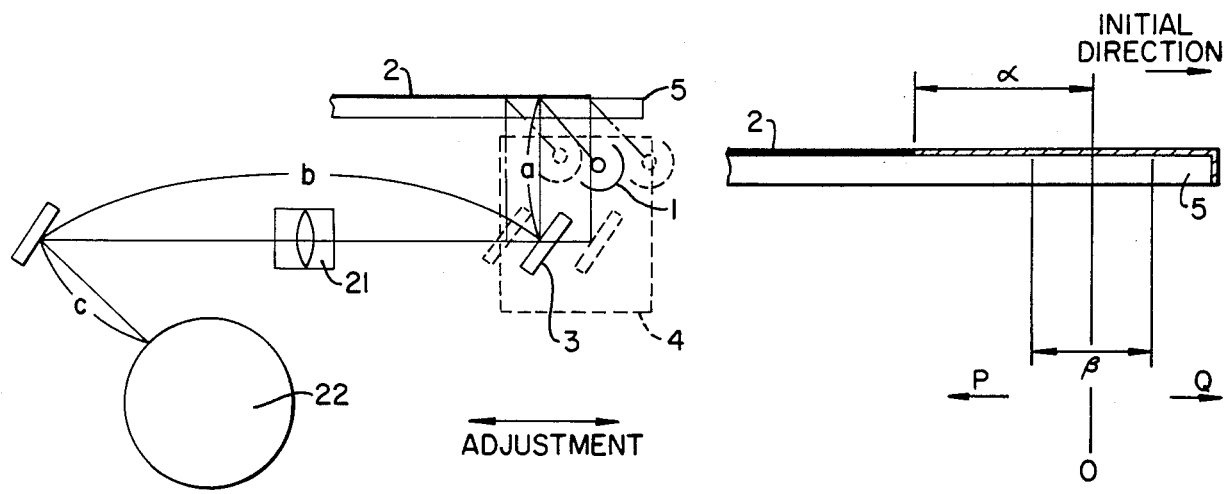

MECHANISM FOR ADJUSTING THE STARTING POSITION OF SLIDING TABLE OF AN ELECTROPHOTOGRAPHIC COPYING MACHINE

This invention relates to an electrophotographic copying machine of a type containing a component which executes a reciprocating linear sliding motion during copying operation and more particularly to such a copying machine which has a unistructural lamp-mirror assembly for fine adjustments of the copying machine's optical system.

Consider a conventional electrophotographic copying machine of a type having a component which executes a reciprocating linear sliding motion during its copying operation such as a glass plate for placing thereon a document to be copied. Such a movable component will be hereinafter referred to as a sliding table for the sake of convenience. Reference being made to FIG. 3 which schematically shows an optical system of such a conventional copying machine, numeral 2 indicates a document to be copied which is placed on a sliding table 5. The optical system typically includes a lamp 1 for illuminating the document surface and a mirror 3 for initially reflecting the beam of light therefrom such that the reflected beam will pass through a converging lens 21 and be focused on the surface of a rotary photosensitive drum 22. One or more additional mirrors are typically inserted along the optical path between the lens 21 and the drum 22.

Reference being still made to FIG. 3, it is extremely important to exactly maintain the optical path length represented therein by a+b+c so that a sharp image of the document will be formed on the drum surface. Since lenses are mass-produced, however, an error fluctuation on the order of about ±1.0% is generally present among the copying machines using these lenses. In order to "absorb" such errors, the lamp 1 and the mirror 3 are usually made as parts of a single unistructural assembly (source unit 4). For each copying machine, the source unit 4 is slidingly moved as shown by the arrows in FIG. 3 at the time of assembly so as to vary the distance b, thereby absorbing the error.

In order to obtain a sharp image by fully utilizing the optical capability of the copying machine, however, it is not sufficient to merely adjust the distance a+b+c. At the beginning of each copying operation, the sliding table 5 does not instantaneously begin to travel at a stable rate. Before the table 5 reaches a steady speed, it travels a finite distance indicated by $\alpha$ in FIG. 4. This distance $\alpha$ will be hereinafter referred to as the start-up distance for the sake of convenience. Reference now being made to FIGS. 4, 8 indicates a distance by which the source unit 4 is moved for adjustment as explained above and O indicates the center of illumination.

It now goes without saying that irradiation to the document 2 to be copied should not be started before the sliding table 5 reaches a steady rate of movement.

However, the start-up distance $\alpha$ is actually dependent on the distance $\beta$ by which the sliding table 5 is moved for adjustment. In other words, the forward edge of the document 2 may not be exactly at the illumination center O because of this fluctuation in the value of $\alpha$ from one copying machine to another.

It is therefore an object of the present invention to eliminate the problem described above in connection with an electrophotographic copying machine of the type which has a sliding table and a unistructural lamp-mirror assembly for fine adjustment of its optical system.

The above and other objects are attached by providing to such an electrophotographic copying machine as described above an attachment plate which is adjustable with respect to its main body in the direction of motion of the sliding table independently of the lamp unit and a detector means secured to the attachment plate for determining the starting position of the sliding table. It is intended that the position of the attachment plate is adjusted after the adjustment of the lamp unit is completed such that the start-up distance $\alpha$ will be of a specified value.

The accompanying drawings, which are incorporated in and form a part of the specification, illustrate an embodiment of the present invention and, together with the description, serve to explain the principles of the invention.

FIGS. 1-A and 1-B schematically show the structure of a part of a copying machine of a type embodying the present invention, having a sliding table.

FIGS. 2-A and 2-B are respectively a front view and a side view showing a mechanism according to the present invention for adjusting the starting table position of a copying machine of the type having a sliding table.

FIG. 3 is a schematic drawing of an optical system for a copying machine of the type with a sliding table.

FIG. 4 is a drawing which shows the initial distance (start-up distance) traveled by the table of FIG. 3.

In FIG. 1, numeral 25 indicates a switch for detecting the starting position of the sliding table 5 and numeral 27 indicates a switch for detecting the position at which the sliding table 5 reverses the direction of its motion. When a starting switch for copying operation (not shown) is turned on, the table 5 moves firstly in the direction of the arrow P (to the left) and stops momentarily when the switch 25 is put in the ON position such that the distance between the illumination center O and the front edge of the document is of a predetermined value $\alpha$. At this moment, the table 5 is at the position indicated by A in FIG. 1-A. After a predetermined duration of time in this condition, the table 5 begins to move in the direction of the arrow Q (to the right) and starts a copying process. This motion in the direction of the arrow Q is stopped after the table 5 travels a predetermined distance and the switch 27 is turned on. At this moment, the table 5 is at the position indicated by B in FIG. 1-A. As soon as the switch 27 is turned on, the table 5 moves again in the direction of the arrow P and returns to the initial position, completing a copying cycle. In FIG. 1-B, numeral 6 indicates an attachment plate which is secured to the table 5 and supports pieces 7 and 8 for compressing the switches 25 and 27.

The switches 25 and 27 are attached as shown in FIGS. 2-A and 2-B. An attachment plate 10 is affixed to the copying machine's main body 9 by means of a screw 11 and the switches 25 and 27 are attached to the front and back surfaces of this plate 10. The switches 25 and 27 may be microswitches adapted to be switched on when the piece 7 or 8 reaches the position of their actuators 12 and 13. The attachment 10 is provided with a hole 14 through which the screw 11 is passed to secure the plate 10 to the body 9. The hole 14 is elongated as shown in FIG. 2-A in the direction of motion of the table 5. This is for the fine adjustment of the plate 10 in the direction of motion of the table 5 by controlling the position at which the screw 11 is fastened.

Adjustment of the mechanism shown above is effected as follows. Initially, when the distance between the forward edge of the document 2 and the illumination center O is set equal to the start-up distance α, the source unit 4 is moved in the direction of P and the plate 10 is secured at a position similarly shifted in the direction of P. When the source unit 4 is moved in the direction of Q, the plate 10 is similarly secured at a position shifted also by the same distance in the direction of Q. Variations in the start-up distance α can thus be eliminated by a simple operation on the source unit 4.

In summary, an extremely simple mechanism according to the present invention enables one to make adjustments easily so as to uniformize the variations in the start-up distance of the table associated with the fine adjustment of the source unit.

The foregoing description of a preferred embodiment of the invention has been presented for purposes of illustration and description. It is not intended to be exhaustive or to limit the invention to the precise form disclosed, and obviously many modifications and variations are possible in light of the above teaching. Such modifications and variations which may be apparent to a person skilled in the art are included within the scope of this invention. It is intended that the scope of the invention be defined by the claims appended hereto.

What is claimed is:

1. In an electrophotographic copying machine comprising a document-carrying table which is movable along given directions at least between an initial position and an exposure position and a source unit which includes in a unitized structure a lamp light source and a mirror serving to initially reflect the reflected light from a document to be copied, the position of said source unit being adjustable at the time of assembly of said copying machine, the improvement wherein said copying machine further comprises an attachment member which is adjustable in said directions independently of said source unit and serves to adjust the distance between said initial position and said exposure position, and means for detecting said starting position of said table, said detecting means being secured to said attachment member.

2. The copying machine of claim 1 further comprising second means for detecting the position where said table reverses the direction of its motion.

3. The copying machine of claim 1 further comprising a main body, said attachment member having a hole elongated in said directions and being adjustably secured with respect to said main body by a screw passing through said elongated hole.

4. The copying machine of claim 1 wherein said attachment member serves to adjust said distance between said initial and exposure positions of said table after said source unit is adjusted.

* * * * *